Sept. 18, 1962            M. T. DUHAMEL            3,054,177

METHOD OF MAKING VALVE LIFTER BODIES OR THE LIKE

Filed Sept. 4, 1958            2 Sheets-Sheet 2

INVENTOR

Maurice T. Duhamel

BY

ATTORNEYS

United States Patent Office 3,054,177
Patented Sept. 18, 1962

3,054,177
METHOD OF MAKING VALVE LIFTER BODIES OR THE LIKE
Maurice T. Duhamel, Wolcott, Conn., assignor, by mesne assignments, to Textron Inc., Providence, R.I., a corporation of Rhode Island
Filed Sept. 4, 1958, Ser. No. 759,026
4 Claims. (Cl. 29—534)

This invention relates to a method of making hollow cylindrical cup-shaped bodies such as valve lifters, for example, and more particularly to a method of making such an article from wire or bar stock in a number of operations during which the workpiece is gradually enlarged in cross-sectional size and thereafter extruded backwardly over an advancing punch to form the finished article.

In making such articles in the past, it has been the custom to prepare workpieces or slugs which have been cut from solid bar stock and feed such workpieces after they are phosphate coated to a press where the finished part is formed by a blow of the press. In the present invention it is contemplated that the workpiece be progressively enlarged in diameter and thus prepared for the final operation of extrusion so it is unnecessary to provide phosphate or similar coatings on the workpiece. Moreover, the article is completely manufactured in a single machine as contrasted with prior methods wherein the slug or workpiece is cut or prepared by one machine and thereafter coated and fed to another such as a press or the like for the final operation.

One object of the present invention is to provide a new and improved method of making hollow cup-shaped bodies of generally cylindrical shape.

Still another object of the invention is to provide a new and improved process for making hollow cup-shaped bodies of cylindrical form from wire or rod stock in various steps in the same machine wherein a length of stock is fed to a cut-off die and thereafter a severed workpiece is delivered in turn to various processing stations in the machine.

Still another object of the invention is the provision of a hollow cylindrical cup-shaped metal article by cutting off a workpiece from a length of solid bar or wire stock, enlarging in various steps the cross-sectional size of the workpiece, and thereafter, by the action of a die and extruding punch, extruding the metal of the blank backwardly over the punch to form the finished article.

To these and other ends the invention consists in the novel features and combinations of parts to be hereinafter described and claimed.

Figure 1:
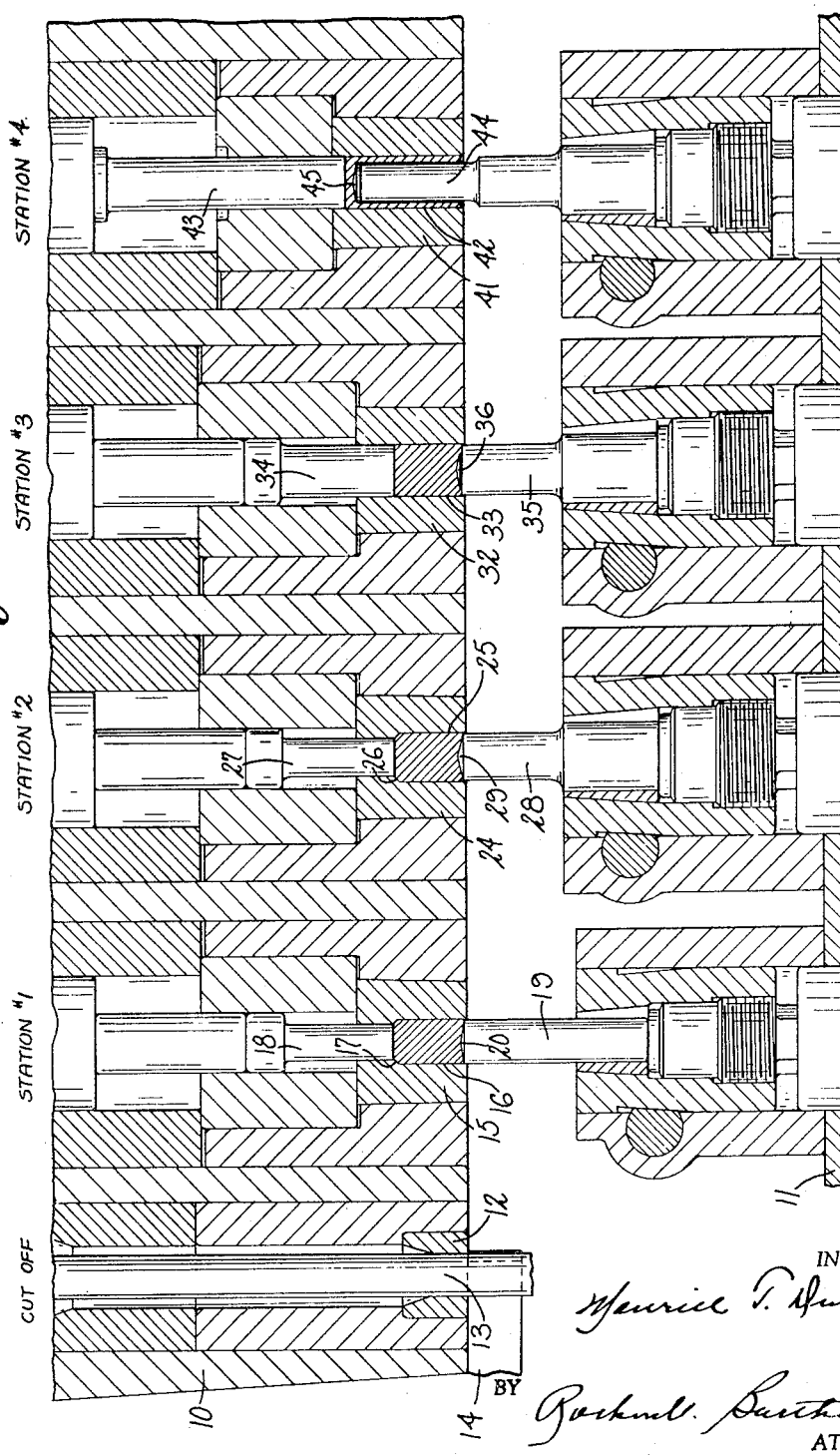
Figure 2:
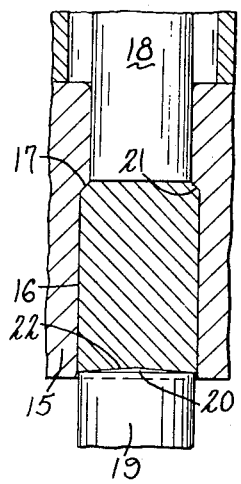
Figure 3:
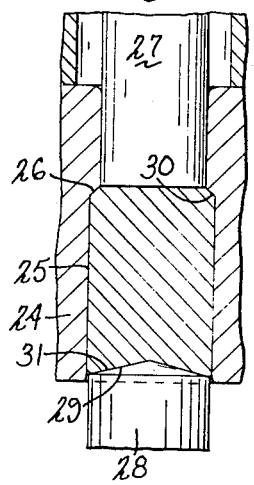
Figure 4:
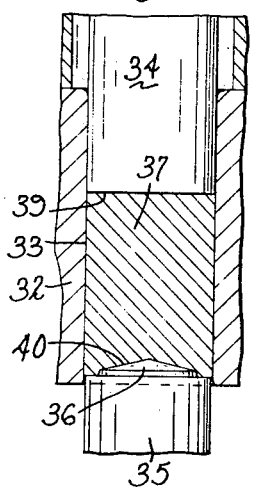
Figure 6:
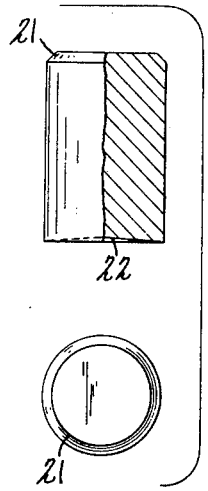
Figure 7:
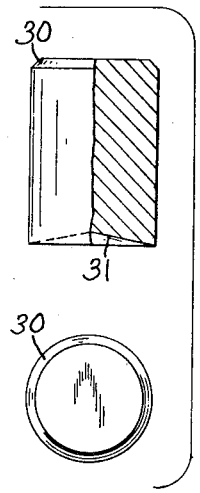
Figure 8:
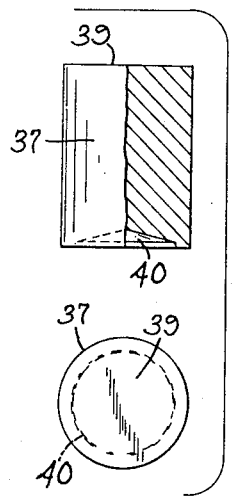

In the accompanying drawings:
FIG. 1 is a sectional view of an apparatus for carrying out my improved process;
FIGS. 2, 3, 4 and 5 are sectional views showing the process performed at the four working stations in the apparatus following the cut-off station;
FIGS. 6, 7 and 8 each represents an elevational view partly in section and a top plan view of the workpiece at the first, second and third working stations in the apparatus; and
FIG. 9 comprises an elevational view partly in section and a top plan view of the finished part.

As illustrated in FIG. 1 of the drawings, the apparatus on which the improved method is performed is provided with a die bed 10 having a plurality of dies therein to be hereinafter described in detail, and a reciprocating gate 11 having a plurality of punches, each of which cooperates with one of the dies referred to.

In the die bed is provided a cut-off die 12 through which may be fed a length of wire or rod stock 13 of suitable cross-sectional size and a knife or severing member 14 may be advanced to cut a workpiece from the projecting end of the stock and deliver it to the first working station in the machine. As these parts are all of the usual form and well known in the art, no further description thereof is necessary.

At the first working station of the machine a die 15 is provided having a die opening 16 of circular shape in cross section and slightly larger in diameter than that of the workpiece cut from the length of stock 13. The die opening 16 is slightly chamfered at its rear end, as shown at 17, and a knockout punch 18, operated in the usual manner, is provided to eject the workpiece from the die after it has been processed. The gate at this station is provided with a punch 19 having a slight angle or flat cone 20 at its end to indent the blank and cause the metal thereof to flow more uniformly to the sides of the die cavity.

The blank is squared at this first station and, as shown in FIG. 6, is provided with a chamfer or bevel 21 at its die face and a shallow indentation 22 at the punch face. It is also enlarged to some extent in cross-sectional size. The provision of the chamfer 17 of the die opening and the consequent forming of the chamfer 21 on the workpiece prevents any tendency for a projection or fin to be formed at this point. It is desirable that the knock-out punch 18 be slightly smaller in size than that of the die opening in order to slide freely therein, and this clearance is sometimes sufficient to cause a fin to be formed on the blank in the absence of the chamfer.

After the operation at station No. 1, the blank is transferred by suitable means (not shown) to the second working station wherein is provided a die 24 having an opening 25 of circular cross section therein, the opening also being provided with a chamfer 26 at its rear end. A knock-out pin 27 serves to eject the workpiece from the die after it has been processed. The gate is provided with a punch 28, this punch also being provided with a cone-shaped end 29 of slightly sharper form than that of the punch 19.

At this station the blank is sized and its diameter slightly enlarged. After the operation the form of the blank is shown in FIG. 7 where the die end is provided with a chamfer 30 and the punch face with an indentation 31. The chamfer 30 is provided for the same purpose as the chamfer 21 previously described, and it will be noted that the indentation 31 is slightly deeper than the indentation 22 so that the operation of the punch has applied outward or radial pressure as well as axial pressure to the metal of the blank to cause it to flow laterally uniformly in order to fill the die opening.

The blank is then transferred to the third or doming station of the apparatus wherein a die 32 is provided having an opening 33 to receive the blank or workpiece. It may be noted, as in the case at the second station, the die opening 33 is slightly larger than the die opening 25 so that the blank will again be enlarged at this station. A knock-out punch 34 is provided as before, which knock-out punch is of approximately the same diameter as the cylindrical opening of the die, there being no chamfer at the inner end of the die opening. An indenting punch 35 is provided upon the gate to cooperate with the die 32, this indenting punch being provided with a tip 36 to form a relatively deep indentation in the blank as compared with that previously formed.

When the blank or workpiece has been processed at station No. 3, it is in the form shown at 37 in FIG. 8. It will be noted that the die face of the blank has been flattened as shown at 39 so as to remove the previously formed chamfer and a relatively deep indentation 40 formed in the punch face of the blank. This indentation serves to properly center and guide the punch at the extruding station which will be described below. As previously implied the workpiece 37 is of circular shape in cross section and has been slightly enlarged in diameter at this station.

The blank or workpiece is then transferred to station No. 4. At this station an extruding die 41 is provided having a circular opening 42 of slightly larger diameter than the opening 33 in the die 32. A knock-out punch 43 is provided to eject the blank from the die at the proper time. At this station the gate is provided with an extruding punch 44 having a cone-shaped tip 45. The end of this punch is received in the indentation 40 to which it is complemental in shape and which serves to accurately and properly center the punch and guide it into the metal of the blank.

Figure 5:
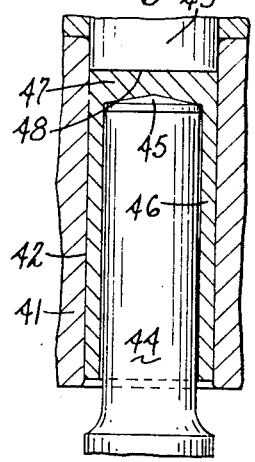
Figure 9:
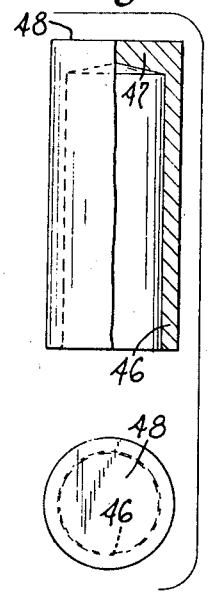

When the gate is advanced at this station the punch is driven into the workpiece, as shown in FIG. 5, causing the metal of the workpiece to be extruded backwardly over the punch to form a hollow cup-shaped body. After the operation at this station the completed part is shown in FIG. 9. As will be apparent the punch has been driven into the workpiece, extruding the metal around the punch to form a cup-shaped hollow body having a side wall 46 and a bottom wall 47 at the die end of the blank as the advance of the gate is not sufficient to drive the punch entirely through the blank. The rear face of the workpiece is flat, as shown at 48, as is the outer end of the knock-out punch 43 that contacts it.

When the gate is retracted, the cup-shaped article will normally be withdrawn from the die with the punch and may be stripped from the punch by suitable stripper means of usual construction and disengaged from the apparatus. This stripper mechanism (not shown) may be mounted below the die opening and moved upwardly when the gate is being retracted to engage the workpiece.

While I have shown and described a preferred method of carrying out my improved process, it is not limited to all of the steps shown but is capable of modification and variation within the spirit of the invention and within the scope of the appended claims.

What I claim is:

1. The method of making a hollow cup-shaped metal article, closed at one end, comprising cutting an elongated workpiece from a length of solid stock of circular cross section, confining said workpiece in a die opening of greater diameter than that of the workpiece, applying pressure to the end faces of the workpiece to enlarge the diameter of the latter, form a peripheral chamfer at one end thereof, and an indentation at the face of the workpiece at the other end, transferring said workpiece to a die having an opening of larger cross section than that of the workpiece and applying pressure to both end faces thereof over an area substantially equal to the cross-sectional area of the blank to flatten the chamfered end thereof and increase the indentation in the other face, then transferring the blank to a cylindrical opening of uniform diameter in a third die and, while supporting the rear end of the workpiece, over its entire end face, against rearward movement, driving a punch into the indented face, to be guided thereby and extrude the metal of the workpiece backwardly about the punch to form a cylindrical cup-shaped metal article of uniform outside diameter having a flat end face upon its closed end.

2. The method of making a hollow cup-shaped metal article comprising cutting an elongated workpiece from a length of solid stock of substantially circular cross section, confining said workpiece in a die and applying pressure to the end faces thereof to enlarge its diameter and form a peripheral chamfer at one end thereof while indenting the face of the workpiece at the other end, transferring said workpiece to the opening in another die in the same machine and applying pressure to the opposite ends thereof to enlarge its diameter while re-chamfering the previously chamfered end face and increasing the depth of indentation at the other face, again transferring the workpiece to the opening of a third die in the same machine, and applying pressure to both faces thereof to enlarge its diameter, flatten the chamfered die end thereof, and form a deeper guiding indentation in the face at the other end, and again transferring the workpiece to a cylindrical opening of a fourth die closed at its inner end and of uniform diameter and forcing a punch into the indented face of the blank so that the punch will be guided by said indentation, and holding the blank against rearward movement by pressure upon its entire end face to effect backward extrusion of the metal of the workpiece about the punch and form a hollow cup-shaped article closed at one end, having a flat end face, and the travel of the last-named punch being sufficient to form a cavity of considerably greater depth than the outside diameter of the completed article.

3. The method of making a hollow cup-shaped article comprising confining an axially elongated workpiece formed from a length of solid stock of circular cross section in a die opening of greater diameter than that of the workpiece, applying pressure to the ends of the workpiece to cold form it and thereby harden it while enlarging the diameter of the workpiece, forming a peripheral chamfer at one end and indenting the face of the workpiece at the other end, transferring said hardened workpiece to a die for further cold forming, the die having an opening of larger cross section than that of the workpiece, and applying pressure to both ends of the workpiece to flatten the chamfered end thereof and increase the indentation in the other end, then transferring the hardened workpiece to an opening in a third die and, while supporting the rear end of the workpiece against rearward movement throughout the face thereof, driving a punch into the indented end to be guided thereby and extrude the metal of the workpiece backwardly about the punch to form a cup-shaped metal article having a bottom provided with a flat outer face.

4. The method of making a hollow cup-shaped article comprising confining an axially elongated workpiece formed for a length of solid stock of circular cross section in a die opening of greater diameter than that of the workpiece, applying pressure to the ends of the workpiece to cold form it and thereby harden it while enlarging the diameter of the workpiece, forming a peripheral chamfer at one end and indenting the face of the workpiece at the other end, transferring said hardened workpiece to a die for further cold forming by applying pressure to its ends to enlarge its diameter while rechamfering the previously chamfered end and increasing the depth of indentation in the other end, again transferring the hardened workpiece to an opening of a third die and applying pressure to both ends of the workpiece to further cold form it while enlarging its diameter, flattening the chamfered end thereof and forming a deeper indentation in the other end, then transferring the hardened workpiece to an opening in a fourth die and, while supporting the rear end of the workpiece against rearward movement throughout the face thereof, driving a punch into the indented end to be guided thereby and extrude the metal of the workpiece backwardly about the punch to form a cup-shaped metal article having a bottom provided with a flat outer face, the depth of the cavity in the cup being substantially greater than the outside diameter of the completed article.

References Cited in the file of this patent

UNITED STATES PATENTS

| Number | Name | Date |
|---|---|---|
| 2,090,641 | Rosenberg | Aug. 24, 1937 |
| 2,417,569 | Rice | Mar. 18, 1947 |
| 2,689,359 | Friedman | Sept. 21, 1954 |
| 2,748,464 | Kaul | June 5, 1956 |
| 2,762,108 | Friedman | Sept. 11, 1956 |